(12) United States Patent
Banerjee

(10) Patent No.: US 6,922,727 B2
(45) Date of Patent: Jul. 26, 2005

(54) METHOD AND SYSTEM FOR MANAGING PARALLEL DATA TRANSFER THROUGH MULTIPLE SOCKETS TO PROVIDE SCALABILITY TO A COMPUTER NETWORK

(75) Inventor: Dwip N. Banerjee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 09/891,338

(22) Filed: Jun. 26, 2001

(65) Prior Publication Data

US 2002/0199000 A1 Dec. 26, 2002

(51) Int. Cl.[7] .............................................. G06F 15/16
(52) U.S. Cl. ...................... 709/227; 709/203; 709/232
(58) Field of Search ................................. 709/200–203, 709/217–219, 227, 228, 231, 232, 236; 719/310–320

(56) References Cited

U.S. PATENT DOCUMENTS

| | | | | | |
|---|---|---|---|---|---|
| 5,796,954 | A | * | 8/1998 | Hanif et al. ................. | 709/231 |
| 5,854,841 | A | * | 12/1998 | Nakata et al. .............. | 713/152 |
| 5,941,950 | A | * | 8/1999 | Hwang et al. .............. | 709/227 |
| 6,192,389 | B1 | * | 2/2001 | Ault et al. .................. | 718/101 |
| 6,622,159 | B1 | * | 9/2003 | Chao et al. ................. | 709/203 |
| 6,754,701 | B1 | * | 6/2004 | Kessner ...................... | 709/219 |
| 6,802,065 | B1 | * | 10/2004 | Riedmann ................... | 719/312 |
| 2001/0029548 | A1 | * | 10/2001 | Srikantan et al. ........... | 709/250 |
| 2002/0120716 | A1 | * | 8/2002 | Raghunathan et al. ...... | 709/219 |
| 2002/0156835 | A1 | * | 10/2002 | Williams et al. ............ | 709/203 |
| 2002/0199000 | A1 | * | 12/2002 | Banerjee ..................... | 709/227 |

OTHER PUBLICATIONS

Girija et al. "Pthreads for dynamic parallelism", Technical Report CMU–CS–98–114, Computer Science Department, Carnegie Mellon University, Apr. 1998.*

D. C. Schmidt, "Acceptor and Connector: Design Patterns for Initializing Communication Services," in Pattern Languages of Program Design (R. Martin, F. Buschmann, and D. Riehle, eds.), Reading, MA: Addison–Wesley, 1997.*

T. J. Hacker, "The End–to–End Performance Effects of Parallel TCP Sockets on a Lossy Wide–Area Network", Aug. 2001.*

* cited by examiner

Primary Examiner—William A. Cuchlinski, Jr.
Assistant Examiner—Yemane Mesfin Gerezgiher
(74) Attorney, Agent, or Firm—Diana L. Roberts; Edmond A. DeFrank

(57) ABSTRACT

A method and system for managing the transfer of data in parallel through multiple sockets. The present invention facilitates the use of multiple sockets and avoid monopolization of a socket by releasing the socket as soon as data from a client request has been sent to a server application. The present invention also includes a novel socket assignment technique that assigns only available sockets. This novel socket assignment technique avoids bottlenecking and delays due to socket contention and increases efficiency. The socket assignment technique of the present invention can assign sockets using a round robin technique, which assigns a server application to a first available socket, a random technique, which assigns a server application randomly to an available socket, or a user-defined technique, which assigns a thread to an available socket as determined by a user.

20 Claims, 4 Drawing Sheets

METHOD AND SYSTEM FOR MANAGING PARALLEL DATA TRANSFER THROUGH MULTIPLE SOCKETS TO PROVIDE SCALABILITY TO A COMPUTER NETWORK

BACKGROUND OF THE INVENTION

1. Field of the Invention

The present invention relates in general to computer networks and more particularly to a parallel data transfer method and system for managing the transfer of data in parallel through multiple sockets.

2. Related Art

Computer networks are widespread and vitally important to many types of enterprises including businesses, universities and government. In general, a computer network is two or more computers (or associated devices) that are connected by communication facilities. One type of computer network is a client/server network. A client/server network includes a server, which is a computer or a process that provides shared resources to users of the network, and a client, which is a computer or a process that accesses the shared network resources provided by the server using the communication facilities.

In general, a client in a client/server network obtains information from a server by sending a request to the server. When the server receives the request, a server application on the server fills the request by obtaining the requested information and sending the information through the network to the client. The Internet (via the World Wide Web (WWW)) is an example of a client/server network. The Internet is a public wide-area network (WAN) environment that enables a client to request and receive data located on a remote server.

The server computer includes a network adapter card that physically transmits and receives packets of data between the server computer and a client computer over the network. The server computer also includes server applications that are software for manipulating data. For example, server applications may include database programs, spreadsheets and browsers. Each server application can access the network through the network adapter card. The network adapter card is only a single physical connection between the server computer and the network, but can support multiple virtual connections between the multiple server applications and the card.

Each virtual connection between a server application and the network adapter may be divided into three elements. A virtual port is at the network adapter card side of the virtual connection. The network adapter card normally can support multiple virtual ports. An application process (also called a "thread") is on the other side of the virtual connection. When the application is a server application, the application process is called a server process. The thread can be processed by a processor on the server computer. Each server application may be running several threads, and multiple threads may be processed by the processor simultaneously.

A socket is used to connect a thread to a virtual port. A socket is a software object that allows a thread of a server application to communicate with a virtual port of the network adapter card. The procedure of creating a socket between a thread of a server application and a virtual port of the network adapter card is known as "binding" the server application to the socket. When a server application is "bound" to a socket, a connection is made between a thread of the server application and a virtual port of the network adapter card. When this connection is established, the server application is able to communicate with the network adapter card and receive and transmit data over the network.

Current socket techniques create a socket and bind a server application to the socket each time a client makes a request to the server. The server application stays bound to the socket from the time the client request is received to the time the server application sends a response to the client. In other words, a single server application monopolizes the socket until the client request is fulfilled. The server receives a client request, determines to which server application the client request is directed, creates a socket, bind the server application to the socket, processes the data and send the data to the client to fulfill the client request. All during this time the server application stays connected to the socket until the client request is fulfilled.

One problem with these current socket techniques is that multiple server applications are contending for the single socket. While a single server application monopolizes a socket other server applications are unable to access the network adapter card. This becomes a major bottleneck that can cause a reduction in network performance.

Some current socket techniques attempt to avoid this problem by allowing two sockets to be used. In this socket pair technique, one server application is bound to one socket and another server application is bound to the other socket such that a socket pair is formed. The socket pair technique uses a socket assignment procedure to determine which server application is assigned to which socket.

One problem with the socket pair technique is that the socket assignment procedure is will assign a socket even if the socket is in use and unavailable. This will cause socket contention and force a server application to wait for the socket to become available. For example, the socket assignment procedure in the socket pair technique will assign the first socket of the socket pair. If this first socket is being used already by a server application, then the procedure will keep trying to acquire the socket. After several attempts the procedure may assign the second socket. However, valuable time is wasted and efficiency decreased because current socket assignment procedures always assign the first socket, even if that socket is not available. Thus, current socket pair techniques do little to alleviate socket contention and bottlenecks and to increase efficiency.

Therefore, what is needed is a method and system for managing the transfer of data using a socket that avoids monopolization of the socket by a single server application. What is also needed is a method and system for managing data the transfer of data through multiple sockets that assigns sockets such that server applications are assigned only to available sockets. What also is needed is a method and system for managing the transfer of data through multiple sockets that provides multiple socket binding and assignment within the framework of existing operating systems.

SUMMARY OF THE INVENTION

To overcome the limitations in the prior art as described above and other limitations that will become apparent upon reading and understanding the present specification, the present invention includes a parallel data transfer method and system for managing the transfer of data in parallel through multiple sockets. The present invention allows the use of multiple sockets so that monopolization by a single server application is avoided. The present invention releases a socket as soon as data has been transferred through the socket. This release of the socket means that the socket can be bound to other server applications. Thus, when a client request is sent through a socket to a server application the present invention does not allow the server application to monopolize the socket until the client request has been filled. Instead, the socket is released after the client request is sent to the server application, thereby making the socket available to other server applications.

In addition, the present invention includes a novel socket assignment technique that only assigns available sockets. Before assignment, the intended socket is checked to ensure that the socket is not in use. This novel socket assignment technique avoids bottlenecking and delays due to socket contention and increases efficiency. Moreover, the parallel data transfer method and system of the present invention is scalable by adding more sockets as demand increases. The present invention is also easily implemented into current operating systems.

The parallel data transfer method of the present invention allows the efficient transfer of data between a computer and a computer network. A virtual connection (or socket) is established between an application process (or "thread") on the computer and a network adapter card in communication with the computer network. The socket is used to transfer data between a first application process and the network adapter card. When the data is finished transferring, the socket is made available (or released) to other application processes.

The present invention also includes creating multiple sockets to allow parallel transfer of data between application processes on the computer and the computer network. Upon request by an application process, that process is assigned to an available socket. In order to determine that the socket is available, a check is made of the socket to ensure that the socket is not being used. Socket assignment is performed using a variety of socket assignment techniques. One such technique is a round robin technique, which assigns available sockets in a round robin manner. Another technique is a random technique, whereby available sockets are assigned randomly. Moreover, a user defined technique may be used whereby an available socket is assigned as defined by a user.

The parallel data transfer system of the present invention includes a parallel sockets module that provides parallel data transfer through multiple sockets having application processes bound to each socket. The parallel sockets module includes a module that demultiplexes received network data (such as a client request) and also multiplexes network data that is transmitted from the application through the socket to the network adapter card. In addition, the parallel sockets module includes a binding module capable of binding an application process to a socket and an assignment module that uses a novel socket assignment technique to assign available sockets.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Exemplary Operating Environment

The following discussion is designed to provide a brief, general description of a suitable environment in which the present invention may be implemented. It should be noted that FIGS. 1 and 2 depict only one of several ways in which the present invention may be implemented.

Figure 1:
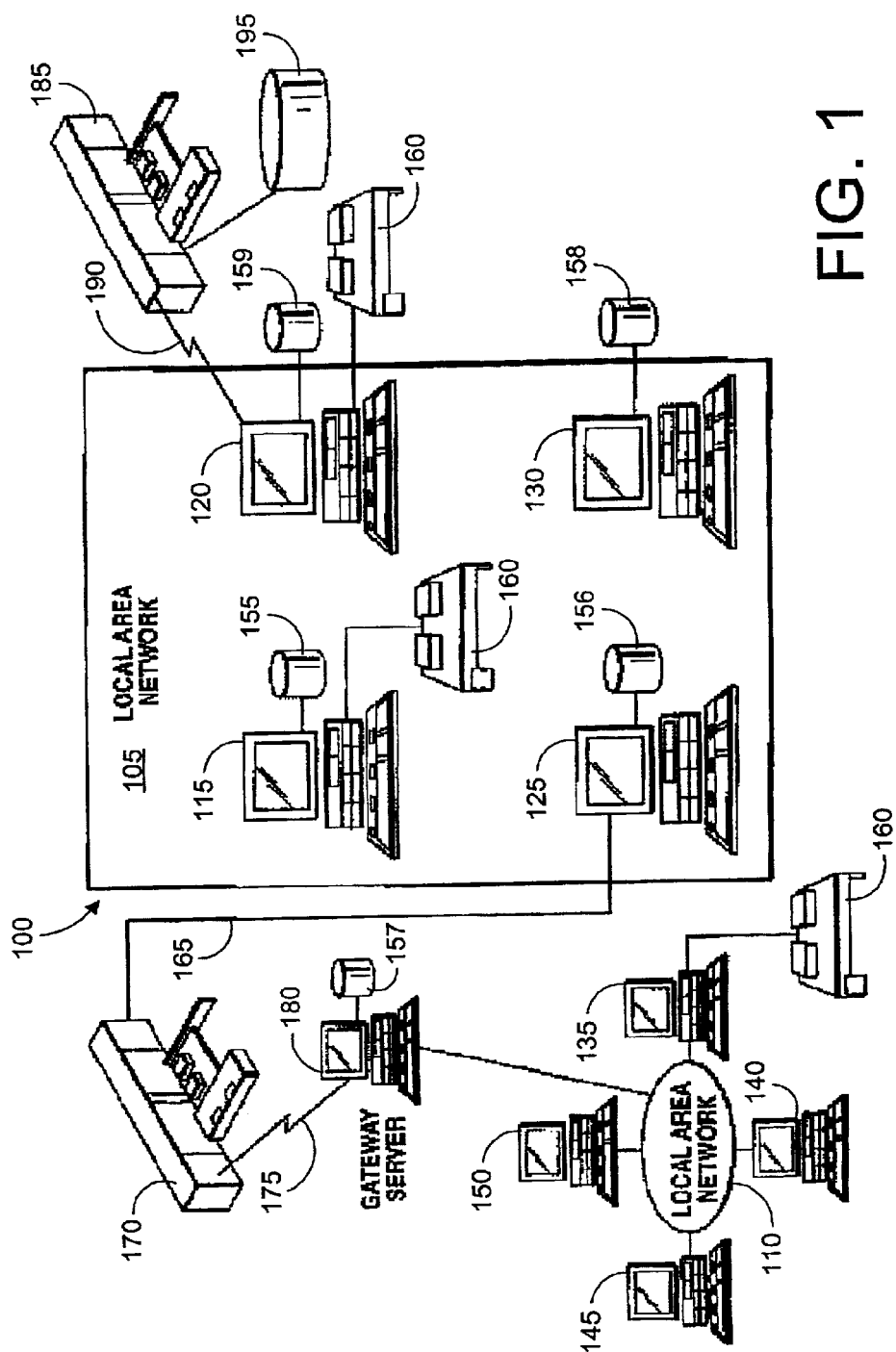
FIG. 1 illustrates a conventional hardware configuration for use with the present invention.

FIG. 1 illustrates a conventional hardware configuration for use with the present invention. In particular, an enterprise computer system 100 may include one or more networks, such as local area networks (LANs) 105 and 110. Each of the LANs 105, 110 includes a plurality of individual computers 115, 120, 125, 130, 135, 140, 145 and 150. The computers within the LANs 105, 110 may be any suitable computer such as, for example, a personal computer made by International Business Machines (IBM) Corporation, located in Armonk, N.Y. Typically, each of the plurality of individual computers is coupled to storage devices 155, 156, 157, 158 and 159 (such as a disk drive or hard disk) that may be used to store data (such as modules of the present invention) and computer-executable instructions in accordance with the present invention. Each of the plurality of individual computers 115, 120, 125, 130, 135, 140, 145, 150 also may be coupled to an output device 160 (such as a printer) for producing tangible output. The LANs 105, 110 may be coupled via a first communication link 165 to a communication controller 170, and from the communication controller 170 through a second communication link 175 to a gateway server 180. The gateway server 180 is preferably a personal computer that serves to link the LAN 105 to the LAN 110.

The computer system 100 may also include a plurality of mainframe computers, such as a mainframe computer 185, which may be in communication with one or more of the LANs 105, 110 by means of a third communication link 190. The mainframe computer 185 is typically coupled to a storage device 195 that is capable of serving as a remote storage for one or more of the LANs 105, 110. Similar to the LANs 105, 110 discussed above, the storage device may be used to store data and computer-executable instructions in accordance with the present invention. Those skilled in the art will appreciate that the mainframe computer 185, the LAN 105 and the LAN 110 may be physically located a great distance from each other. By way of example, a user may use a client system of the mainframe computer 185 to access information located on a server of the LAN 105.

Figure 2:
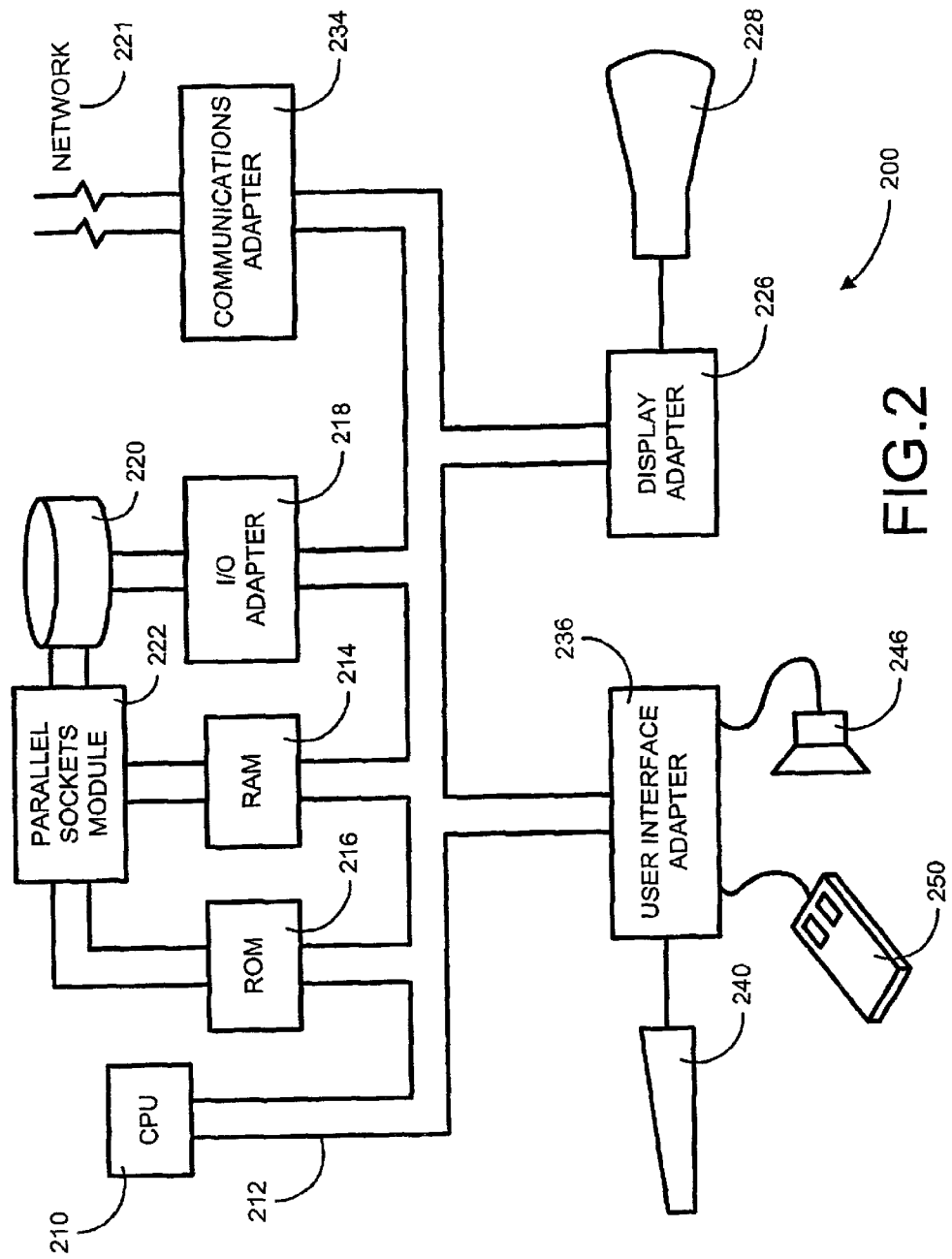
FIG. 2 is a block diagram of an individual computer system of FIG. 1 incorporating the present invention and is shown for illustrative purposes only.

FIG. 2 is a block diagram of an individual computer system (such as a network server computer) of FIG. 1 incorporating the present invention and is shown for illustrative purposes only. A computer 200 includes any suitable central processing unit (CPU) 210, such as a standard microprocessor, and any number of other objects interconnected by a system bus 212. For purposes of illustration, the computer 200 includes memory such as random-access memory (RAM) 214, read-only memory (ROM) 216, and storage devices (such as hard disk or disk drives 220) connected to the system bus 212 by an input/output (I/O) adapter 218. The computer 200 may be a network server that is capable of connecting and interacting with a plurality of client machines over a communication channel (such as a network 221). Moreover, the network server is able to receive network requests from the plurality of client machines and serve up requested data to the client machines. Accordingly, as shown in FIG. 2, at least one of the memory devices (such as the RAM 214, ROM 216, and hard disk or disk drives 220) contains a parallel sockets module 222 in accordance with the present invention that contains computer-executable instructions for carrying out the present invention. As explained in detail below, the parallel sockets module 222 enables the present invention to manage the transfer data of using multiple sockets, and also includes a novel socket assignment technique for assigning a server application to a socket.

The computer 200 may further include a display adapter 226 for connecting the system bus 212 to a suitable display device 228. In addition, a user interface adapter 236 is capable of connecting the system bus 212 to other user interface devices, such as a keyboard 240, a speaker 246, a mouse 250 and a touchpad (not shown). In a preferred embodiment, a graphical user interface (GUI) and an operating system (OS) reside within a computer-readable media and contain device drivers that allow one or more users to manipulate object icons and text on the display device 228. Any suitable computer-readable media may retain the GUI and OS, such as, for example, the RAM 214, ROM 216, hard disk or disk drives 220 (such as magnetic diskette, magnetic tape, CD-ROM, optical disk or other suitable storage media).

II. General Overview and Components of the Invention

Figure 3:
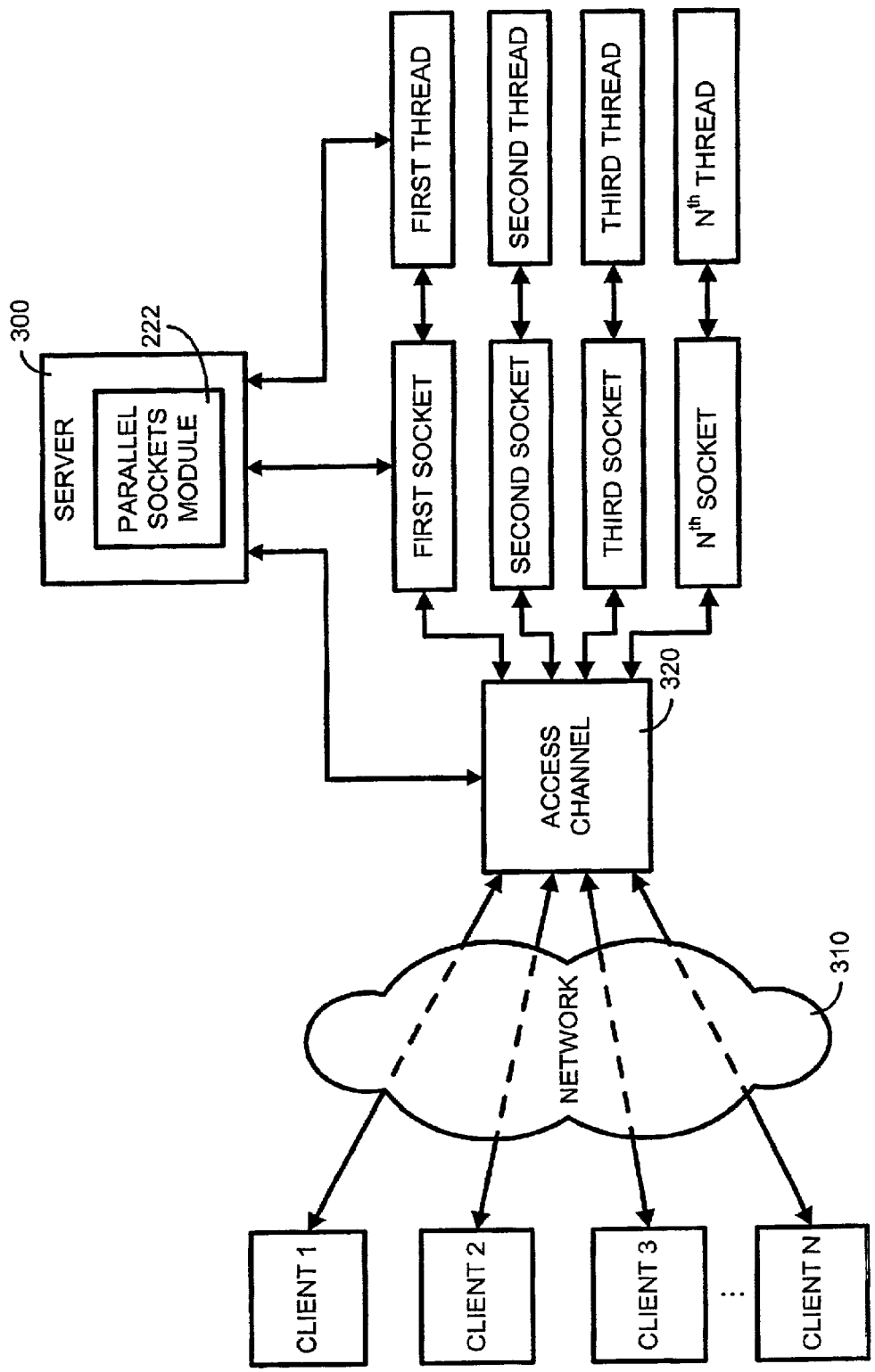
FIG. 3 is a general block diagram illustrating an overview of the present invention.

The parallel sockets module 222 of the present invention provides parallel data transfer through multiple sockets. For example, the parallel data transfer may occur when a server receives client requests from a plurality of client machines and then processes each request using different server applications. The present invention allows the threads of these different server applications to be bound to a corresponding socket. Alternatively, multiple threads of a single server application may be bound to a corresponding socket. FIG. 3 is a general block diagram illustrating an overview of the present invention. In particular, a plurality of client machines (client 1, client 2, client 3 to client N) are connected to a server 300 through a network 310. It should be noted that N may be any number and even though four clients are shown in FIG. 3, any number of clients may be used.

The plurality of client machines access the server 300 through an access channel 320 that in communication with the network 310. In a preferred embodiment, the access channel 320 includes multiple virtual ports that are in communication with a network adapter card. In this manner, data may be transferred through a socket through the access channel to the network adapter card and out over the network 310. The plurality of client machines is able to request and receive data from the server 300 through the access channel 320. The server 300 also includes the parallel sockets module 222 of the present invention that enables parallel data transfer through the multiple sockets.

As shown in FIG. 3, multiple sockets (a first socket, a second socket, a third socket and a $N^{th}$ socket) are bound to the access channel 320. In addition, each of the multiple sockets is capable of having at least one corresponding thread that is bound to a particular socket. Each of these threads may be associated with a single server application or each thread may be associated with a different server application. It should be noted that although FIG. 3 illustrates one thread per socket, multiple threads per socket could be used. Moreover, there may be situations where sockets are available and there are no threads bound to a socket. In addition to binding the multiple sockets to the access channel 320, the parallel sockets module 222 also uses a novel socket assignment technique to assign a thread to an available socket.

The present invention releases a socket as soon as data has been transferred through the socket. As soon as data is finished transferring through a socket the socket is released. This allows the socket to be bound to other server applications. For example, when a client request is sent through a socket to a server application the present invention does not allow the server application to monopolize the socket until the client request has been filled. Instead, the socket is released after the client request is sent to the server application, thereby making the socket available to other server applications.

Figure 4:
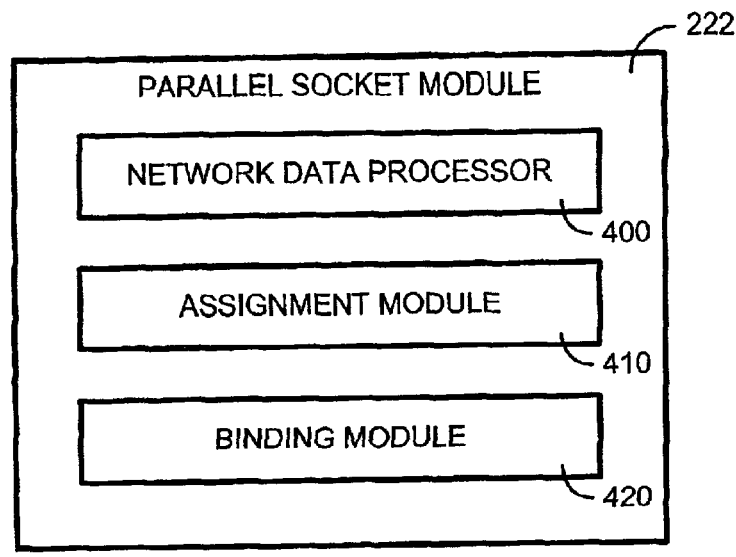
FIG. 4 is a general block diagram of the parallel sockets module of the present invention shown FIGS. 2 and 3.

FIG. 4 is a general block diagram of the parallel sockets module 222 of the present invention shown FIGS. 2 and 3. In particular, the parallel socket module 222 includes a network data processor 400 that divides network data into separate data units (such as packets). Because the network data is transmitted to and received from the network 310 through a network adapter card, both the incoming and outgoing network data must be serialized. Thus, the network data processor 400 must demultiplex incoming network data (in order to facilitate parallel data transfer) and must multiplex outgoing network data (in order to facilitate its transmission over the network 310). This demultiplexing is performed by dividing the network data into separate network requests (such as client requests). For example, when the network data processor 400 receives a plurality of client requests in the form of packets the network data processor 400 demultiplexes them into separate requests from different clients. Moreover, when network data is transmitted from the server 300 through the access channel 320, the data is multiplexed by the network data processor 400 before being sent out over the network 310.

The parallel sockets module 222 also includes an assignment module 410 for assigning a server application thread to an available socket. As explained in detail below, the assignment module 410 uses novel assignment technique to assign threads only to available sockets. Once a thread has been assigned to an available socket, a binding module 420 binds the thread to the assigned socket.

III. Operational Overview and Working Example

In general, the operation of the present invention provides for the parallel transfer of data through multiple sockets. The parallelizing of data transfer is accomplished by using a multi-thread operating system architecture, allowing multiple sockets and binding at least one thread to each available socket as needed. The method of the present invention is scalable, provides efficient support for multi-thread operating systems, and can be implemented within the framework of existing operating systems.

Figure 5:
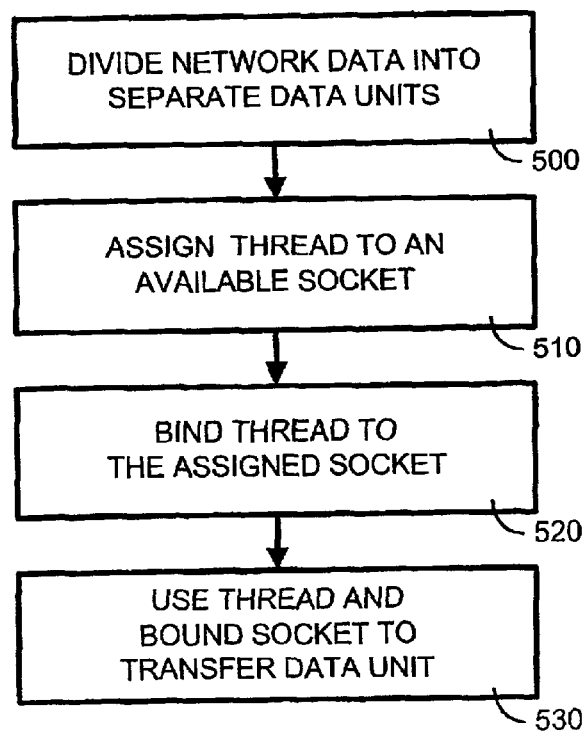
FIG. 5 is a flow diagram illustrating the general operation of the present invention.

FIG. 5 is a flow diagram illustrating the general operation of the present invention. First, network data is divided into separate data units (box 500), such as packets. If the network data is incoming from the network adapter card, this step demultiplexes the network data into data units. Next, upon request a thread is assigned to an available one of the multiple sockets (box 510) and the thread is then bound to the assigned socket (box 520). Finally, at least one of the data units is transferred using the socket and the thread assigned to the socket (box 530).

The socket assignment technique of the present invention includes assigning a thread to an available socket. This assignment may be accomplished in a variety of techniques, including random, user-defined and, in a preferred embodiment, a round robin technique. The round robin technique assigns each thread to a first available socket. The random technique assigns a thread randomly to an available one of the plurality of sockets. The user-defined technique assigns a thread to an available one of the plurality of sockets as determined by a user. This may include, for example, every other socket, every third socket, or any other scheme determined by the user.

In order to illustrate the above method of the present invention, a working example is presented. It should be noted that this example is only one of many implementations of the present invention that is possible, and is provided for illustrative purpose only. In order to provide a technique is scalable to handle high-volume traffic, incoming client requests must be demultiplexed into separate client requests. In this working example, a port and a local IP address (LIA) are used such that multiple socket may be bound to each. The kernel of the operating system must be able to support a socket implementation that allows efficient demultiplexing of the incoming request to the port and the LIA. The server then has multiple instantiations of sockets bound to the port and the LIA, with each socket servicing a different client that is accessing the socket pair.

In order for the multi-thread, multi-socket technique of the present invention to be scalable, both the transmission and reception of data by the server must be parallized. In order to use multiple sockets bound to the port and the LIA, a reusable socket option was used. This option permits sockets to be reused. Transmitting data is then achieved by having thread serve one socket and transmitting data through the thread's corresponding socket (which is bound to the same LIA and port) in parallel.

For the reception of data, a round robin technique of assigning sockets to processing threads was used. When a request was received at a LIA and port combination, the request could potentially be serviced by any of the sockets bound to the LIA and port combination and the socket's corresponding thread. A round robin assignment technique is preferred because the client requests then are distributed evenly among the available sockets (and corresponding threads) thereby providing scalability by design. It is the server's responsibility to determine how to respond to each network request received through any of these sockets. Because all the sockets are serving the same LIA and port combination, theoretically it does not matter how the server handles the data request or transmission once the request reaches the server.

Although a round robin assignment technique was used in this example, the present invention also includes other types of assignment techniques, such as random or user-defined. In this working example a round robin assignment technique was used because it required minimal modifications. All that was necessary was to use a round robin assignment technique instead of the current first fit assignment technique (or assigning the thread to the first socket). This means that virtually no change to the socket application programming interface (API) is needed. Moreover, minimal requirements are imposed on applications. Applications can incorporate scalability by using the reusable socket option available for most operating systems and extending the implementation of the application's functionality to encompass multiple threads. The application, however, is responsible to map the data received on a reused socket to the appropriate thread.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method in a computer system for transferring data, comprising:

receiving the data in parallel and demultiplexing the data into separate data units;

using a socket to create a virtual connection to transfer data between a first application process residing on a server computer and a process residing on a client computer of a computer network;

assigning and binding a thread to an available socket;

releasing the socket as soon as the data has finished transferring to allow the virtual connection to transfer data between a second application process and the process residing on the client computer of the computer network; and reusing at least one socket and allowing the thread to serve at least one socket and transmit data through the thread's corresponding socket in parallel.

2. The method as set forth in claim 1, further comprising using a plurality of sockets to create additional virtual connections between application processes and processes on plural client computers of the computer network.

3. The method as set forth in claim 2, further comprising assigning each of the application processes to an available one of the plurality of sockets.

4. The method as set forth in claim 3, wherein each of the plurality of sockets is determined not to be in use prior to the assigning.

5. The method as set forth in claim 3, wherein assigning is performed using at least one of the following assignment techniques: (a) round robin; (b) random, (c) user defined.

6. A computer-readable medium having computer-executable instructions for performing the method as set forth in claim 1.

7. A method in a computer system for transferring data between a computer having a processor and a client computer of a computer network, comprising:

receiving the data in parallel and demultiplexing the data into separate data units;

creating a plurality of sockets capable of using virtual connections between processes executing on the processor and a process residing on the client computer of the computer network;

assigning each of the processes to an available socket of the plurality of sockets in response to a request for a socket;

releasing at least one socket as soon as associated data has been transferred; and reusing at least one socket and allowing the processes to serve at least one socket and transmit data in parallel through the socket of the corresponding process.

8. The method as set forth in claim 7, wherein assigning is performed using a round robin socket assignment technique.

9. The method as set forth in claim 7, wherein assigning is performed using a random socket assignment technique.

10. The method as set forth in claim 7, wherein assigning is performed using a user-defined assignment technique.

11. The method as set forth in claim 7, wherein the data is divided into separate data units.

12. The method as set forth in claim 7, wherein the data are incoming network requests and the incoming network requests are demultiplexed into separate network requests corresponding to a data unit.

13. A data transfer system in a computer system for transferring network data, comprising:

a demultiplexer that receives the data in parallel and demultiplexes it into separate data units;

a plurality of sockets for using a virtual connection between a process residing on a server computer and a process residing on a client computer of a computer network;

a plurality of threads for processing the network data, each one of the plurality of threads capable of being assigned one of the plurality of sockets; and a release module that releases at least one socket as soon as associated data has been transferred and allows reuse of the released socket for enabling an associated thread to serve at least one socket and transmit data in parallel through the socket of the corresponding thread; and a parallel sockets module in communication with the plurality of sockets and the plurality of threads that provides parallel transfer of the network data using the plurality of sockets.

14. The data transfer system as set forth in claim 13, wherein the parallel sockets module further comprises a network data processor that divides the network data into a plurality of data units.

15. The data transfer system as set forth in claim 13, wherein the parallel sockets module further comprises an assignment module that use a socket assignment technique to assign at least one of plurality of threads to an available one of the plurality of sockets.

16. The data transfer system as set forth in claim 15, wherein the parallel sockets module further comprises a binding module that binds the assigned thread to the assigned socket.

17. The data transfer system as set forth in claim 15, wherein the socket assignment technique is a round robin technique that assigns the thread to a first available socket.

18. The data transfer system as set forth in claim 15, wherein the socket assignment technique is a random technique that assigns the thread randomly to an available one of the plurality of sockets.

19. The data transfer system as set forth in claim 15, wherein the socket assignment technique is a user-defined technique that assigns the thread to an available one of the plurality of sockets as determined by a user.

20. A computer-implemented method for transferring data between a network server and a client computer of a computer network, comprising:

receiving the data in parallel and demultiplexing the data into separate data units;

using a socket having a virtual connection between a first server process on the network server and a process residing on the client computer of the computer network;

determining that the socket is available;

binding the first server process to the available socket to facilitate the transfer of data;

releasing at least one socket as soon as associated data has been transferred; and making the socket available to a second server process for reuse when the data has finished transferring and allowing the processes to serve at least one socket and transmit data in parallel through the socket of the corresponding process.

* * * * *